(12) United States Patent
Chien et al.

(10) Patent No.: US 8,184,760 B2
(45) Date of Patent: May 22, 2012

(54) ADAPTIVE ELASTIC BUFFER FOR COMMUNICATIONS

(75) Inventors: Jinn-Yeh Chien, Chu Bei (TW); Sheu Shey Ping, Taipei (TW)

(73) Assignee: Taiwan Semiconductor Manufacturing Company, Ltd., Hsin-Chu (TW)

( * ) Notice: Subject to any disclaimer, the term of this patent is extended or adjusted under 35 U.S.C. 154(b) by 932 days.

(21) Appl. No.: 12/202,757

(22) Filed: Sep. 2, 2008

(65) Prior Publication Data

US 2010/0054385 A1 Mar. 4, 2010

(51) Int. Cl.
*H04L 7/00* (2006.01)
(52) U.S. Cl. .......... 375/372; 375/371; 375/354
(58) Field of Classification Search .......... 375/372, 375/371, 354
See application file for complete search history.

(56) References Cited

U.S. PATENT DOCUMENTS

| | | | | |
|---|---|---|---|---|
| 5,563,891 | A | * | 10/1996 | Wang .......................... 370/505 |
| 2005/0002403 | A1 | * | 1/2005 | Roberts et al. ........... 370/395.51 |
| 2007/0260782 | A1 | * | 11/2007 | Shaikli ............................ 710/52 |

\* cited by examiner

*Primary Examiner* — Shuwang Liu
*Assistant Examiner* — Michael Neff
(74) *Attorney, Agent, or Firm* — Slater & Matsil, L.L.P.

(57) ABSTRACT

Circuit and method for an adaptive elastic buffer for receiving data including timing signals. Received data is recovered and stored in the adaptive elastic buffer, and a recovery clock pointer is increased to identify the next buffer location for stuffing received data, responsive to a controller. When a data fetch enable condition occurs, the controller causes a receiver circuit to fetch the data stored at a location identified by a system clock pointer. Underflow and overflow conditions are detected and the controller adapts the effective elastic buffer depth to compensate for these conditions. A buffer of M/2 physical locations is adaptively operated to provide a data buffer of M virtual locations. A method of buffering received data with a buffer having M/2 physical locations so as to provide the benefit of a buffer with M virtual locations is disclosed.

29 Claims, 15 Drawing Sheets

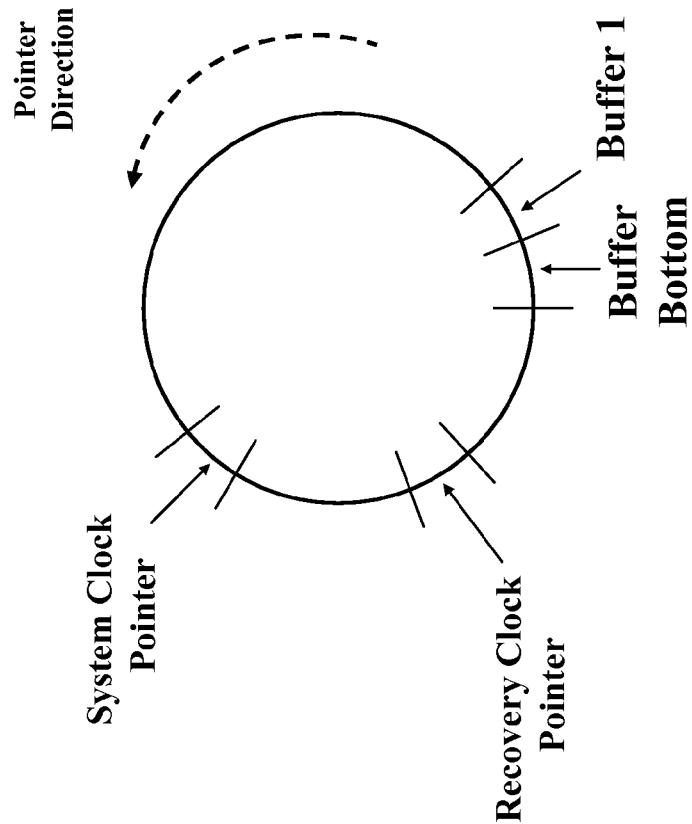
Fig-3b Prior Art Elastic Buffer Circulation

A - CDR Pointer arrives at buffer center.
B – Normal.
C – Recovery clock pointer overtakes system clock pointer.
D - System clock pointer overtakes recovery clock pointer.

A – Elastic starts to fetch data.
(NOT Pre_packet_underflow AND NOT Pre-Packet_overflow AND (count_to_M/2))
OR
(Pre-packet_underflow AND count_to_M/2)
OR
(Pre-packet_overflow AND count_to_2)

B – Normal operation.

C – Overflow - Recovery clock pointer overtakes system clock pointer.

D - Underflow - System clock pointer overtakes recovery clock pointer.

E – Lock the "Pointer Control FSM".

Figure 7

A – Elastic starts to fetch data.
(Pre-packet_underflow AND count_to_M/2)
OR
(Pre-packet_overflow AND count_to_2)
OR
(Metastable AND counter_to_M/4)

B – Normal operation.

C – Overflow - Recovery clock pointer overtakes system clock pointer.

D – Underflow - System clock pointer overtakes recovery clock pointer.

E – Lock the "Pointer Control FSM".

F – Overflow, Underflow counter compare.

Figure 10

ADAPTIVE ELASTIC BUFFER FOR COMMUNICATIONS

TECHNICAL FIELD

The present invention relates to a circuit and method for providing an improved elastic buffer for use in semiconductor devices and integrated circuits that communicate data over a channel. Data is transmitted over a channel and received by a receiver. The timing of the transmit device is independent of the timing of the receiver device. To correctly receive data words a buffer is provided that receives data words from a communications channel at the transmit rate, the words are written into a buffer and later removed from the buffer by the receiver at a receiver clock rate. The present invention is directed to providing an improved adaptive elastic buffer circuit and methods that effectively provide an efficient buffer device.

BACKGROUND

In communications systems, data is often communicated between devices over a channel. The channel may be a wired connection such as a PCI Express, or other cable, or a wireless connection. A transmitter sending data is located physically apart from the receiving device. The transmitter and receiver may have a local clock or timing generator such as a phase locked loop (PLL). In many systems the PLL generates a local version of a clock that may correspond to a system or bus clock. The PCI Express standard, as one non-limiting example, uses serial data with an embedded clock signal in the data stream. This approach has advantages in limiting the number of signal wires required, and the transmitter timing may be recovered at the receiver by use of any one of several known clock and data recovery (CDR) approaches which can extract the clock using edge detection and typically, a phase locked loop (PLL) circuit that is synchronized to the detected edges. However, due to the variance in integrated circuit parameters and processes, the local clock may have a frequency that varies from the clock formed in other devices. This results in a frequency difference between the transmitter and the receiver device that cannot be easily eliminated, due to the practical limitations on the circuits.

One approach to receiving data from a remote transmitter over a channel where the transmitter and receiver are clocked on potentially differing local clocks is to use an "elastic" buffer. Often an elastic buffer is used to buffer the data stream from the data bus into the receiver. The available depth of the elastic buffer must be large enough to attempt to prevent two erroneous conditions: overflow (when too many data words are received from the transmitter before the receiver can empty the buffer, thus the buffer overflows) and underflow (too few data words are received from the transmitter, and thus the receiver has emptied the buffer before more data words are received.) In most expected conditions, there should be room for the transmitter to write new data words into the buffer, likewise the receiver should normally have data available to it in the buffer for reading out, so that both the transmitter and the receiver can operate without interruption or delay cycles and the transmitted data is communicated without any data being lost.

Highly integrated semiconductor circuits are increasingly important, particularly in producing battery operated devices such as cell phones, portable computers such as laptops, notebook computers and PDAs, wireless email terminals, MP3 audio and video players, portable wireless web browsers and the like, and these sophisticated integrated circuits increasingly include on-board data storage. Some integrated circuits are essentially one chip systems, and may be referred to as "SOICs" (System on an integrated circuit) or "SOCs" (Systems on a chip) devices. Because present day integrated circuits have many functions provided within one device, silicon area for each circuit within that device is very important. A large elastic buffer consumes substantial silicon area. For example, in the communications standard known as "PCI Express", with 32 lanes, the receiver is required to have a 12×10×32 buffer. Implementing this buffer results in a requirement of 3840 flip flops; which requires a substantial silicon area. The bigger the elastic buffer, the more safety or margin exists for timing differences, that is, the less likely an underflow, or overflow, condition. However the demand for silicon area increases with increasing buffer size.

Thus, there is a continuing need for an efficient elastic buffer circuit and methods that provide effective data buffering with a reduced silicon area requirement.

SUMMARY OF THE INVENTION

These and other problems are generally solved or circumvented, and technical advantages are generally achieved, by embodiments of the present invention, which provides circuits and methods to improve an elastic buffer.

In one preferred embodiment, a method is provided for performing an elastic buffer of virtual depth M, comprising providing a data buffer of a depth approximately half of depth M; providing a recovery clock pointer indicating the next buffer location to be stuffed with a received data word; providing a system clock pointer indicating the next buffer location having a data word to be fetched by a receiver; providing a clock and data recovery circuit for receiving data and clock signals transmitted over a communications channel; storing received data in a location in the data buffer indicated by the recovery clock pointer; increasing a recovery clock pointer to point to the next location in the data buffer; continuing storing received data in the data buffer and increasing the recovery clock pointer as data signals are received; detecting when a predetermined condition occurs, and enabling a data fetch operation; responsive to the enabling, fetching stored received data from a buffer location indicated by a system clock pointer; and increasing the system clock pointer to indicate the next buffer location to be fetched.

In another embodiment, the above described method is provided, and further continuing to fetch the stored received data from a buffer location indicated by the system clock pointer, and continuing to increase the system clock pointer until all of the data words stored in the buffer are fetched.

In another embodiment, the above described method is provided wherein detecting when a predetermined condition occurs comprises determining that an underflow condition did not occur on a previous cycle; and determining that an overflow condition did not occur on a previous cycle; and determining that the recovery clock pointer has reached a predetermined value.

In another embodiment, the above described method is provided wherein the wherein the predetermined value is M/2. In still another embodiment, the above described method is provided wherein the predetermined value is 2. Other values may be used.

In another embodiment, a method is provided for performing an elastic buffer of virtual depth M, comprising providing a data buffer of a depth approximately half of depth M; providing a recovery clock pointer indicating the next buffer location to be stuffed with a received data word; providing a system clock pointer indicating the next buffer location having a data word to be fetched by a receiver; providing a clock and data recovery circuit for receiving data and clock signals transmitted over a communications channel; storing received data in a location in the data buffer indicated by the recovery clock pointer; increasing the recovery clock pointer to point to the next location in the data buffer; continuing storing received data in the data buffer and increasing the recovery clock pointer as data signals are received; detecting when a predetermined condition occurs, and enabling a data fetch operation; responsive to the enabling, fetching stored received data from a buffer location indicated by a system clock pointer; increasing the system clock pointer to indicate the next buffer location to be fetched; and while fetching the stored data from the buffer, detecting that the system clock pointer is overtaking the recovery clock pointer and setting an underflow indication for use in a future cycle.

In another embodiment, the above described method is provided and further comprising while fetching the stored data from the buffer, detecting that the recovery clock pointer is overtaking the system clock pointer, and setting an overflow indication for use in a future cycle.

In another embodiment, the above described method is provided wherein detecting a predetermined condition further comprises determining that an underflow condition occurred during a previous cycle; and determining that the recovery clock pointer has reached a value of M/2.

In another embodiment, the above described method is provided wherein detecting a predetermined condition further comprises determining that an overflow condition occurred during a previous cycle; and determining that the recovery clock pointer has reached a value of 2.

In another embodiment, the above described method is provided and further comprising while fetching the stored data from the buffer, detecting that a meta-stable condition has occurred, and setting a meta-stable indicator for use in a future cycle.

In another embodiment, the above described method is provided wherein detecting that a meta-stable condition has occurred further comprises detecting that one of an underflow and an overflow condition has occurred; determining the number of underflow and overflow conditions that have occurred over a predetermined period of time; and if the number of underflow and overflow conditions exceeds a predetermined threshold, indicating that a meta-stable condition has occurred.

In another embodiment an elastic buffer circuit of virtual depth M is provided, comprising: a buffer having M/2 physical locations for storing received data words and an output for outputting stored data words; a recovery clock pointer for indicating which of the M/2 locations a received data word is to be stuffed into; a system clock pointer for indicating which of the M/2 locations a stored data word is to be fetched from; a controller for controlling the operations of the buffer, the recovery clock pointer, and the system clock pointer; a clock and data recovery circuit for recovering data and clock signals from a received signal having embedded clock information; and a data fetch enable circuit for detecting a predetermined condition and having an output to the controller; wherein upon receiving a data word from a communications channel in the clock and data recovery circuit, the controller causes the data to be stored in the buffer location indicated by the recovery clock pointer and then increments the recovery clock pointer, and upon receiving the output from the data fetch enable circuit, the controller enables a data fetch circuit to retrieve the data stored at the location indicated by the system clock pointer and then increments the system clock pointer.

In another embodiment the above described elastic buffer circuit is provided wherein the data fetch enable circuit further comprises: an underflow input indicating an underflow condition occurred on a prior cycle; an overflow input indicating an overflow condition occurred on a prior cycle; a count comparator having outputs indicating that the recovery clock pointer has reached a predetermined value of 2, and M/2; logic circuitry for outputting the data fetch enable signal when the underflow input is true and the count comparator indicates the recovery clock pointer has reached M/2; logic circuitry for outputting the data fetch enable circuit when the overflow input is true and the count comparator indicates the recovery clock pointer has reached 2; logic circuitry for outputting the data fetch enable circuit when the overflow input and the underflow input are both false and the count comparator indicates the recovery clock pointer has reached a predetermined value.

In another embodiment, the above described elastic buffer circuit is provided wherein the controller further comprises a finite state machine.

In another embodiment, the above described elastic buffer circuit is provided wherein M is an integer greater than 8. In yet another embodiment, the above described elastic buffer is provided wherein M is greater than or equal to 32.

In another embodiment, the above described elastic buffer circuit is provided wherein the data received from the communications channel is encoded in PCI Express format.

In another embodiment an integrated circuit having a data buffer of a virtual depth M and a physical depth of M/2 is provided, comprising: data receivers coupled to receive signals from a serial communications channel including data signals and embedded clock signals; a clock and data recovery circuit coupled to the data receivers for recovering clock information and data words received from the serial communications channel; a data buffer coupled to receive data words from the clock and data recovery circuit and to store the received data words at locations indicated by a recovery clock pointer; a data fetch circuit coupled to fetch data words stored in the data buffer from locations indicated by a system clock pointer; a control circuit coupled to the data buffer, the recovery clock pointer and the system clock pointer, operable to cause the received data words to be stored in the data buffer at the location indicated by the recovery clock pointer and to increment the recovery clock pointer; the control circuit further having a data fetch enable signal as an input and operable to cause the data fetch circuit to retrieve data words from the buffer at the location indicated by the system clock pointer responsive to the data fetch enable input, and to increment the system clock pointer; and a data fetch enable circuit operable to output the data fetch enable signal upon detection of a predetermined condition.

In another embodiment, the above described integrated circuit is provided wherein the data fetch enable circuit further comprises: an underflow input indicating a data buffer underflow occurred on a prior cycle; an overflow input indicating a data buffer overflow occurred on a prior cycle; a counter compare circuit for outputting indicator signals when the recovery clock pointer reaches a value of 2, and M/2; logic circuitry for outputting the data fetch enable signal when the underflow input is true and the recovery clock pointer reaches M/2; logic circuitry for outputting the data fetch enable signal when the overflow input is true and the recovery clock pointer reaches 2; and logic circuitry for outputting the data fetch enable signal when the underflow input is false and the overflow input is false and the recovery clock pointer reaches a predetermined value greater than 2.

In another embodiment, the above described integrated circuit is provided and further comprising: underflow detection circuitry for detecting an underflow condition when the system clock pointer overtakes the recovery clock pointer during data fetch operations, operable to set the underflow input for a future cycle.

In another embodiment the above described integrated circuit is provided and further comprising overflow detection circuitry for detecting an overflow condition when the recovery clock pointer overtakes the system clock pointer during data fetch operations, operable to set the overflow input for a future cycle.

The foregoing has outlined rather broadly the features and technical advantages of the present invention in order that the detailed description of the invention that follows may be better understood. Additional features and advantages of the invention will be described hereinafter, which form the subject of the claims of the invention. It should be appreciated by those skilled in the art that the conception and specific embodiment disclosed might be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which:

FIG. 3b illustrates the circular operation of the pointers of FIG. 3a;

FIG. 4 illustrates a state diagram for the finite state machine of FIG. 3a;

FIG. 7 illustrates a table showing the transitions of the state diagram of FIG. 6;

FIG. 10 illustrates in a table the transitions for the state diagram of FIG. 9;

The drawings, schematics and diagrams are illustrative, not intended to be limiting but are examples of embodiments of the invention, are simplified for explanatory purposes, and are not drawn to scale.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Figure 1:
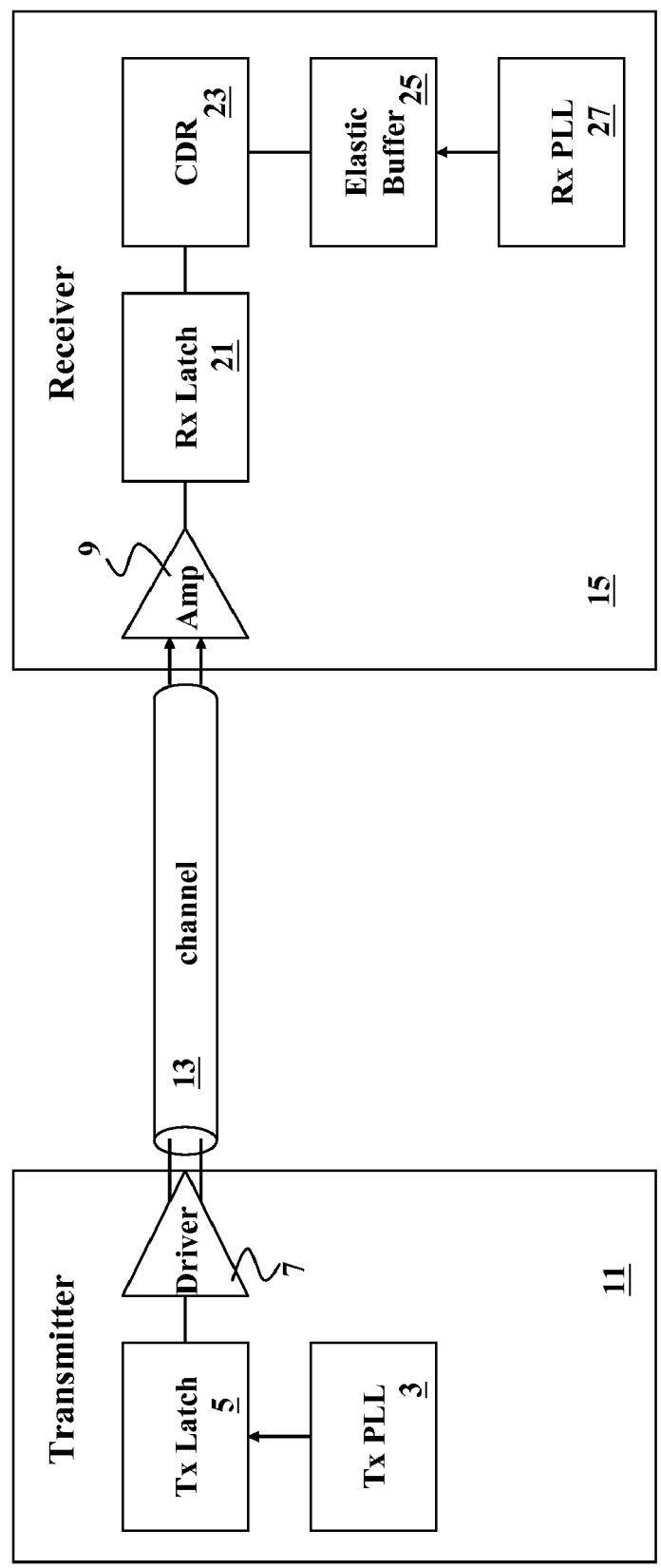
FIG. 1 illustrates a simplified circuit diagram for a transmitter communicating to a receiver over a channel.

FIG. 1 illustrates a simplified system diagram of a transmitter device 11 communicating with receiver 15. Transmitter device 11 may be, without limitation, an integrated circuit, or a system, or a circuit board. Transmitter device 11 has data to transmit over the communications channel 13. The transmitter 11 has a data transmit latch 5 (and other circuitry particular to the function of the transmitter device but not part of the transmit circuitry, this circuitry is not shown in FIG. 1 for simplicity) and a data driver 7. A PLL 3 provides the clocking signals used to clock the data onto channel 13. Channel 13 may be, for example, a serial link for data communications, such as a PCI Express or similar serial data bus, or any other communications channel for data. Serial data buses such as the PCI Express standard buses may include a clock signal that is embedded in the data stream. Transmitter 11 may implement the so-called physical layer (sometimes, "PHY") of the communications channel 13. The data transmitted over the channel may be provided to transmitter device 11 by higher level service layers such as the "LINK" layer or other higher level services layers. Receiver 15 is coupled to the channel 13. Receiver 15 may also be an integrated circuit, a circuit board, a system or be formed as part of a larger integrated circuit, board, or system. Receiver 15 may also implement a PHY of the bus standard used. In the receiver 15, a receiver amplifier 9 amplifies the data which is received from channel 13 into a receiver latch 21. Clock and Data Recovery circuit (CDR) 23 is coupled to recover the embedded transmit clock information and to receive the data from the receiver amplifier 9. The elastic buffer 25 is used to buffer the received data words from the communications channel 13 to the receiver circuit 15, which will clock data out of the buffer according to a local receiver system clock provided by receiver PLL 27. The PCI-Express bus has multiple lanes. Each lane has an elastic buffer. There may be, for example, 32 lanes.

Figure 2:
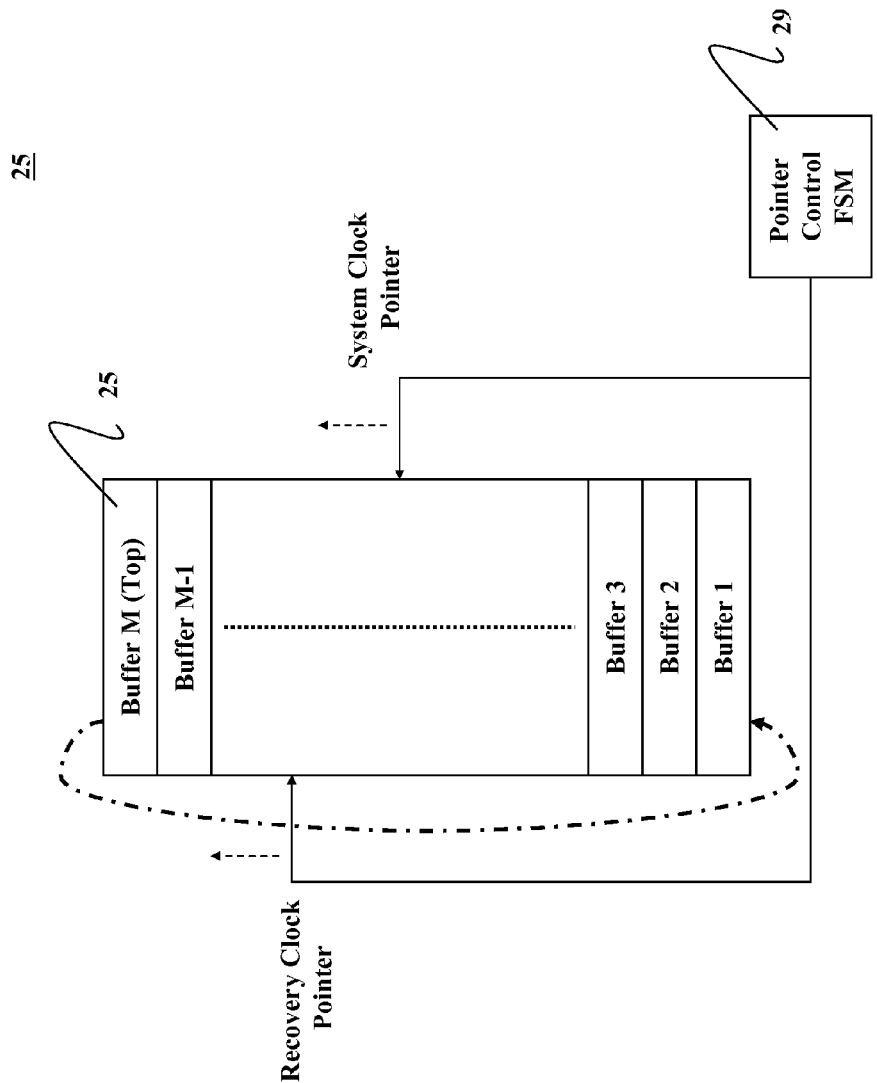
FIG. 2 illustrates a simplified block diagram of a prior art buffer.

FIG. 2 depicts in a simplified block diagram a prior implementation of elastic buffer 25, such as shown in FIG. 1. A column of data registers, formed typically as D flip-flops is shown with two pointers. The buffer is written with data from the channel 13 communicated by the transmitter 11 using a recovery clock pointer, this clock pointer has timing based on the clock recovered by the CDR circuit 23. The receiver reads, or fetches, and removes the data words from the elastic buffer 25 using the system clock pointer. Generally, the buffer 25 is accessed by two slightly different timing regimes, that is, the transmitter may send data at a rate that is greater than, or less than, the rate at which the receiver fetches the data. In order to correctly operate the elastic buffer 25, the two clock pointers are used with a pointer control finite state machine 29.

Figure 3A:
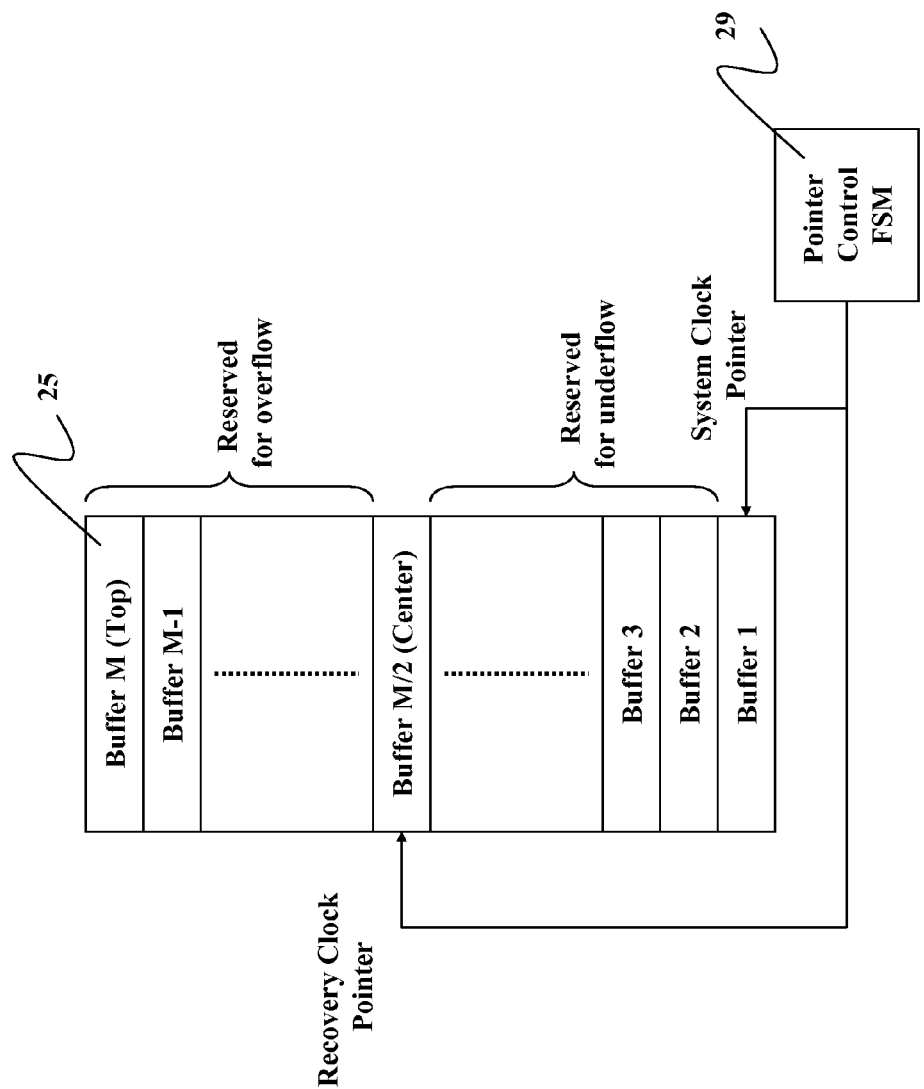
FIG. 3a illustrates another simplified block diagram of a prior art buffer.

FIG. 3a depicts in a simplified block diagram one prior art approach to implementing the elastic buffer 25, such as shown in FIG. 1. In FIG. 3a, prior to the receiver fetching any data from the buffer 25, the recovery clock pointer is normally increased as words are written to the buffer 25, (often this operation is referred to as a "Data Stuff"). This data stuff operation continues until the recovery clock pointer is positioned at, or about at, the center position of the buffer (the center is location M/2 for a buffer of depth M, where M is a positive integer indicating buffer depth). The buffer locations above the center point are provided to compensate for overflow (situations where the transmitter is providing data for storing into the elastic buffer 25 faster than the receiver is fetching the data) and the locations underneath the center position are provided to account for the underflow situation, (situations where the receiver removes or fetches the data faster than the incoming data is provided by the transmitter). The two pointers are monitored and operations are controlled by the finite state machine 29.

If the transmitter and receiver were perfectly synchronized, no buffer would be required; the receiver would fetch each word as it was received from the channel 13. The use of the elastic buffer is to compensate for the fact that, in a practical system, perfect synchronization is not feasible.

FIG. 3b illustrates the relationships of the pointers used in implementing the circular buffer of FIG. 3a. In FIG. 3b, the circular path represents the fact that the pointers will recirculate, once the maximum location M is reached, the pointers return to location 0 and then 1. In a typical operation, the recovery clock pointer is incremented, or increased, each clock cycle that the transmit data is written into the buffer 25. After the recovery clock pointer reaches a certain value, typically this may be M/2, or the center location; (however, note that other locations could be chosen), the finite state machine will enable data fetch operations to begin. As each word is removed the system clock pointer will also be incremented or increased to the next location to be fetched. In this manner the system clock pointer will usually follow the recovery clock pointer until the data buffer is empty.

If the system clock pointer exceeds the recovery clock pointer, then the receiver has removed all of the available words and an underflow situation has occurred, that is the data fetch is retrieving data from buffer 25 faster than the transmitter and the receiver CDR circuit is providing the data. If the recovery clock pointer catches up to the system clock pointer, an overflow condition is occurring, that is the transmitter and CDR circuit are stuffing data into the buffer faster than the receiver is fetching data out of the buffer, the buffer is full and another write operation will (erroneously) overwrite a location that already has received data in it. This data is data that the receiver has not yet fetched out of the data buffer.

Figure 4:
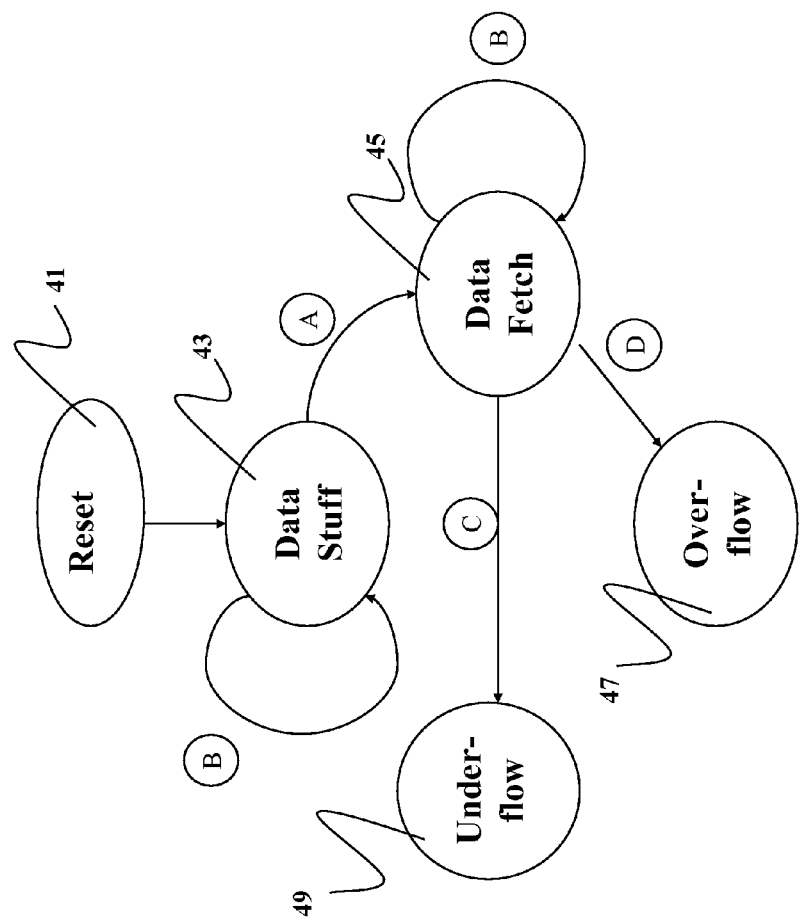

FIG. 4 depicts a prior art state diagram for the states of the finite state machine 29 of FIG. 2. After a reset, the state machine begins in an initial state 41. As data is provided from the channel 13 of FIG. 1, in response to the transmitter 11 sending data, the state machine transitions to state 43, where data is written into the buffer 25 in the "Data Stuff" state. When the recovery clock pointer arrives at, or perhaps near, the center position M/2, as indicated by the transition path labeled "A", the finite state machine transitions into state 45, the "Data Fetch" state. In this state, the receiver removes data from the buffer and typically the transmitter also continues to send data which is stuffed in the buffer. In the transition path labeled "B", normal operations continuously occur, as data arrives from the channel it is stuffed into the data buffer 25 (and the recovery clock pointer is incremented) and as data is fetched from the buffer by the receiver, the system clock pointer is increased. Thus, typically, the recovery clock pointer would be ahead of the system clock pointer as shown in FIG. 3b and described previously. The elastic buffer 25 is circular, so when a pointer reaches the top location or "M", it returns to pointing at the bottom location, as all the bits of that pointer are reset at rollover.

If, while in the Data Fetch state 45, the finite state machine senses that the recovery clock pointer overtakes the system clock pointer, this indicates the elastic buffer has run out of data words for the receiver, and an underflow condition has occurred. In this case, shown as transition path "C", the state machine transitions to state 49. If, during the data fetch state 45, the finite state machine detects a condition where the system clock pointer overtakes the recovery clock pointer, the transmitter has provided more data words than the buffer can hold, the receiver is not removing the data fast enough to keep up with the transmitter, and an overflow condition exists. The state machine then transitions to state 47, where an overflow is indicated.

Figure 5:
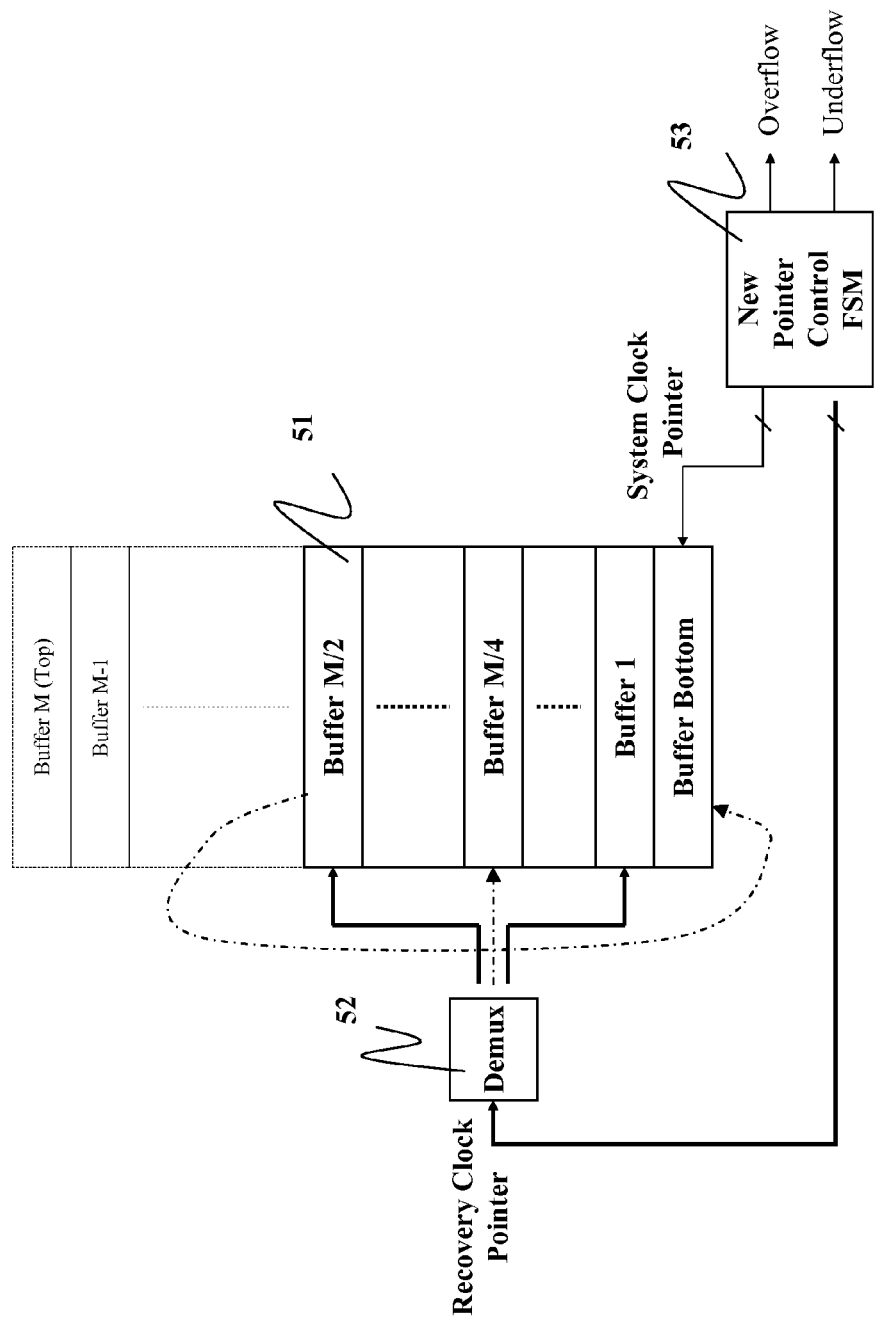
FIG. 5 illustrates a first embodiment of an adaptive elastic buffer incorporating features of the present invention.

FIG. 5 depicts a simplified block diagram of a first embodiment for adaptive elastic buffer architecture of the present invention. In FIG. 5, buffer 51 is shown of depth M/2, or half the length of the prior art buffer (of length M). Those skilled in the art will recognize after reading this description that this depth is somewhat arbitrary and other similar data buffer depths could also be used and the advantages of the use of the embodiments will still be achieved, and the invention is not so limited. The block diagram of FIG. 5 further depicts a new finite state machine FSM 53 for pointer control, and the recovery clock pointer incorporates a demultiplexer function 52 that has two, or optionally three, outputs that are described further below. The system clock pointer is used to fetch data words from buffer 51. By use of the embodiments of the present invention, the buffer of depth M/2 in combination with the operations of the finite state machine 53 can provide the same functionality as the prior art buffer of FIG. 2, which has a depth M. As shown by the dashed lines depicted in FIG. 5, the buffer 51 can then save half the registers, from location M/2 to location M, over the prior art solution. This savings can provide a substantially smaller silicon area while maintaining the same safety margins, because the new pointer control state machine and the methods of operation will provide a buffer of physical depth M/2 that operates as effectively as the prior art elastic buffer of depth M.

Figure 6:
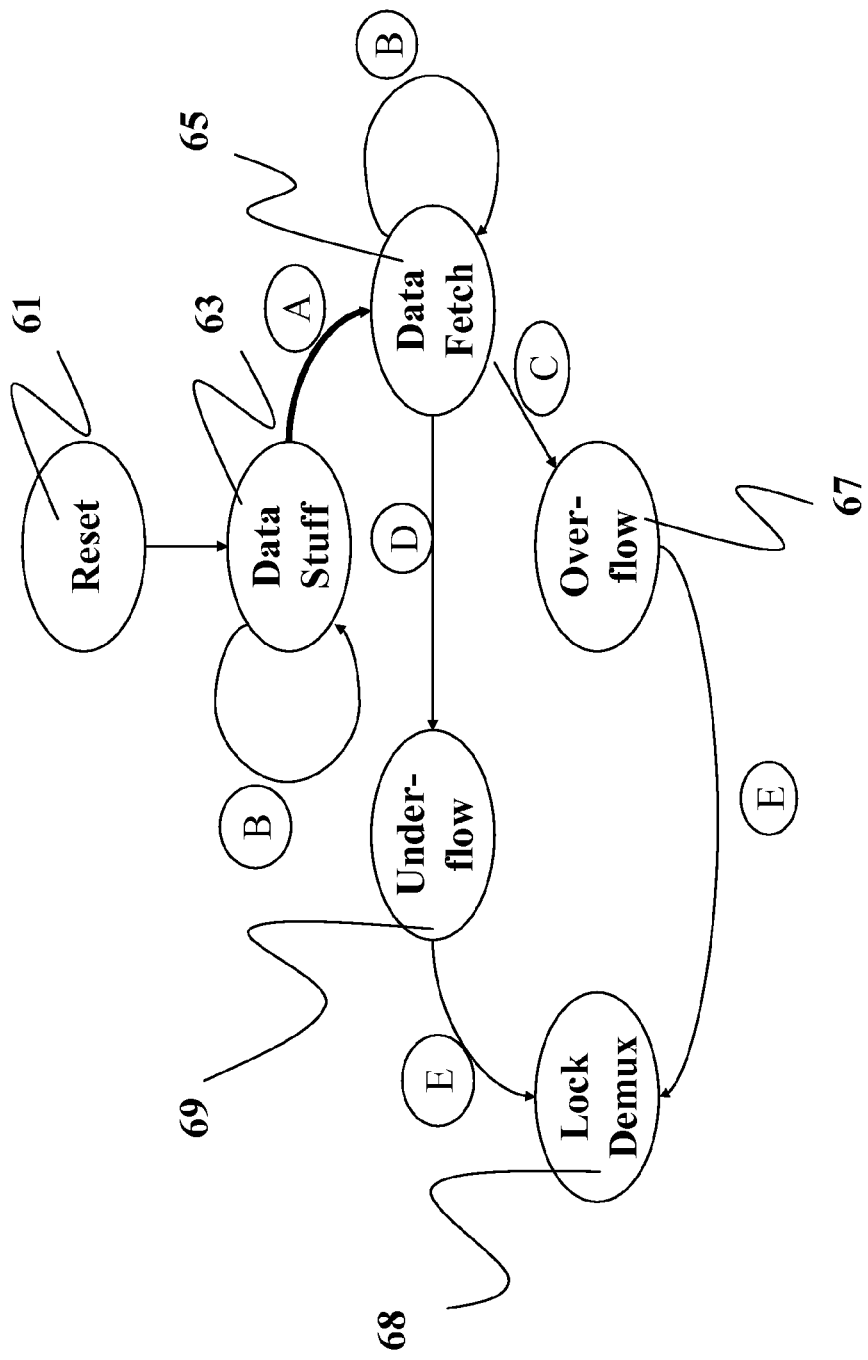
FIG. 6 illustrates an exemplary state diagram of the finite state machine of FIG. 5.

FIG. 6 depicts, in one illustrative embodiment, a possible state diagram for the finite state machine 53 of FIG. 5. In FIG. 6, after a reset, the state machine begins in an initial state 61 labeled Reset/Packet Start. If the state machine is entering the operations without any prior received data packets, the counter is set to either the buffer length M divided by 2, or to address 1. After the first transmit data word, or the M/2 transmit word, arrives over the channel 13, the finite state machine transitions to the Data Stuff state 63 and the recovered data is written into the data buffer from the CDR circuit, as before. The state machine remains in this Data Stuff state 63 until certain conditions are met as described further below. The state machine then transitions see the transition is labeled "A" in the state machine diagram of FIG. 6, to state 65, the Data Fetch state. In state 65 the receiver begins fetching data from the elastic buffer 51 of FIG. 5 while the transmitter continues to stuff data into the buffer. This normal state of operations shown by transition "B", which maintains the state machine in the Data Fetch state while data continues to flow into and out of the elastic buffer 51.

In FIG. 6, a transition labeled "C" occurs when the finite state machine detects that the recovery clock pointer is overtaking the system clock pointer, an overflow condition. The state machine then enters state 67, labeled Overflow. In FIG. 6, a transition labeled "D" occurs when the controller detects that the system clock pointer is overtaking the recovery clock pointer. In this case the receiver is fetching data faster than the transmitter is stuffing data into the buffer, an underflow condition. Transition D then takes the state machine to state 69, labeled "Underflow". From either of the underflow or overflow condition states, the state diagram then transitions in transition E to a state 68, labeled Reset Counter. In the Reset Counter state, the finite state machine records the status of an overflow, or underflow, for the following transaction. The finite state machine stays in the Reset Counter state, continuing to receive and fetch data, until the packet end is detected, and then transition G takes the finite state machine back to the beginning.

In another example, the Data Fetch state 65 continues in transition "B" until the packet end is detected, at which time the finite state machine returns to the beginning state and awaits the next data transmission. So from the Data Fetch state three possible outcomes are seen in the diagram: an Overflow is detected, an Underflow is detected, or a Packet End is detected.

FIG. 7 then depicts, in a table form, the conditions and actions represented by the state transition diagram of FIG. 6. In FIG. 7, transition "A" from the Data Stuff state 63 to the Data Fetch state 65 occurs when no underflow or overflow is detected, and the recovery clock pointer reaches a value, which may be for example "1" or "M/2", for this discussion "M/2" is chosen. Transition "A" also occurs when an underflow condition has occurred in a previous cycle, and the recovery clock counter has incremented to count M/2 (the top of the buffer). In this condition, the buffer is essentially full, and data fetch cycles begin. Because an underflow has occurred in a previous cycle, the finite state machine may allow the buffer to collect more data (allowing more data stuff cycles) before the data fetch transition "A" to attempt to better match the receiver and transmitter data rates.

If, instead, an overflow condition has occurred in a previous cycle, indicated by a signal labeled Pre_packet_overflow, and the recovery clock pointer reaches "2", then the data fetch transition occurs. In this condition, the finite state machine is starting the data fetch cycles earlier than it did previously, to better match the receiver and transmitter data rates to prevent a subsequent overflow from occurring.

Transition "B" occurs in either the data stuff, or data fetch, states and is essentially a normal, or maintain, transition where the state machine remains in the present state, either the data stuff state or the data fetch state. The state machine will remain in this transition loop until either an overflow, an underflow, or a Packet End condition is detected. If the end of the packet is reached in transition B without underflow or overflow detection, the finite state machine will transition back to the reset state with the original counter values.

Transition "C" in FIG. 7 occurs when an overflow is detected, that is, when the recovery clock pointer overtakes the system clock pointer. Because the data fetch state is entered after some number of data stuff states are executed, the recovery clock pointer is typically ahead of the system clock pointer but should not overtake it in the circular buffer pointing scheme. If the recovery clock pointer overtakes the system clock pointer, the buffer is full of data to be fetched and so an overflow is occurring.

Transition "D" in FIG. 7 occurs when an underflow is detected, that is, when the system clock pointer overtakes the recovery clock pointer. Because the data fetch state is not entered until after some number of data stuff cycles are executed, typically the system clock pointer is behind the recovery data pointer as the pointers recirculate around the circular buffer. If the system clock pointer overtakes the recovery clock pointer, this indicates that the buffer is empty, the receiver has fetched all of the available data words in the buffer and the transmitter is providing data slower than the receiver is fetching data.

Transition "E" to the Reset Counter state occurs following either of an overflow, or an underflow detection. When the finite state machine enters the Reset Counter state, the state machine preserves the status, underflow or overflow, for the next packet and continues receiving data until the Packet End is detected.

The finite state machine does not always enter the Reset Counter state, because if during the Data Fetch state in transition B, a Packet End is detected prior to any underflow or overflow condition being detected; the transition G takes the finite state machine back to the Reset/Packet Start state.

Figure 8B:
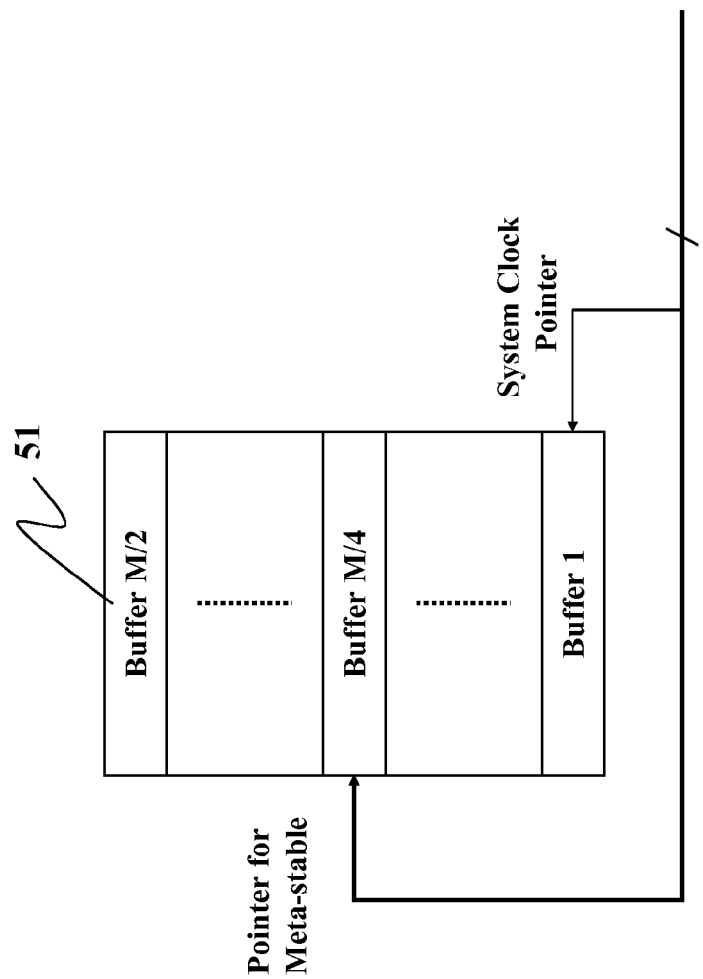
FIG. 8b illustrates in a simplified block diagram an implementation of an embodiment of an elastic buffer that addresses the meta-stable condition.
Figure 8A:
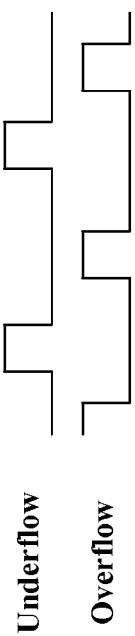
FIG. 8a illustrates in a timing diagram a meta-stable condition of an elastic buffer.

FIG. 8a depicts a situation that is referred to herein as "meta-stable" that may occur. This condition may occur, for example, when the rate the transmit data is stuffed into the data buffer is close to, but not an exact match, of the rate the receiver removes data during data fetch states. In FIG. 8a, underflow detection occurs and then overflow detection occurs, on alternating cycles. If an underflow/overflow condition is followed shortly by an overflow/underflow condition, the data buffer and the clock pointers are being operated in a "meta-stable" state.

In FIG. 8b an embodiment that addresses this condition is shown in a simple block diagram. When the system is operating in a meta-stable state, where the buffer alternates in short periods of time between overflow and underflow conditions, the recovery clock pointer is set to a value in the middle of the buffer, such as M/4 for a buffer depth M/2, and this forces the buffer into a stable condition. In this manner the meta-stable condition may be resolved to a stable operation condition, so that for further cycles of data stuff, and data fetch, as data is transmitted over the channel and recovered by the CDR circuit, the underflow and overflow conditions will not recur in the meta-stable fashion.

Figure 9:
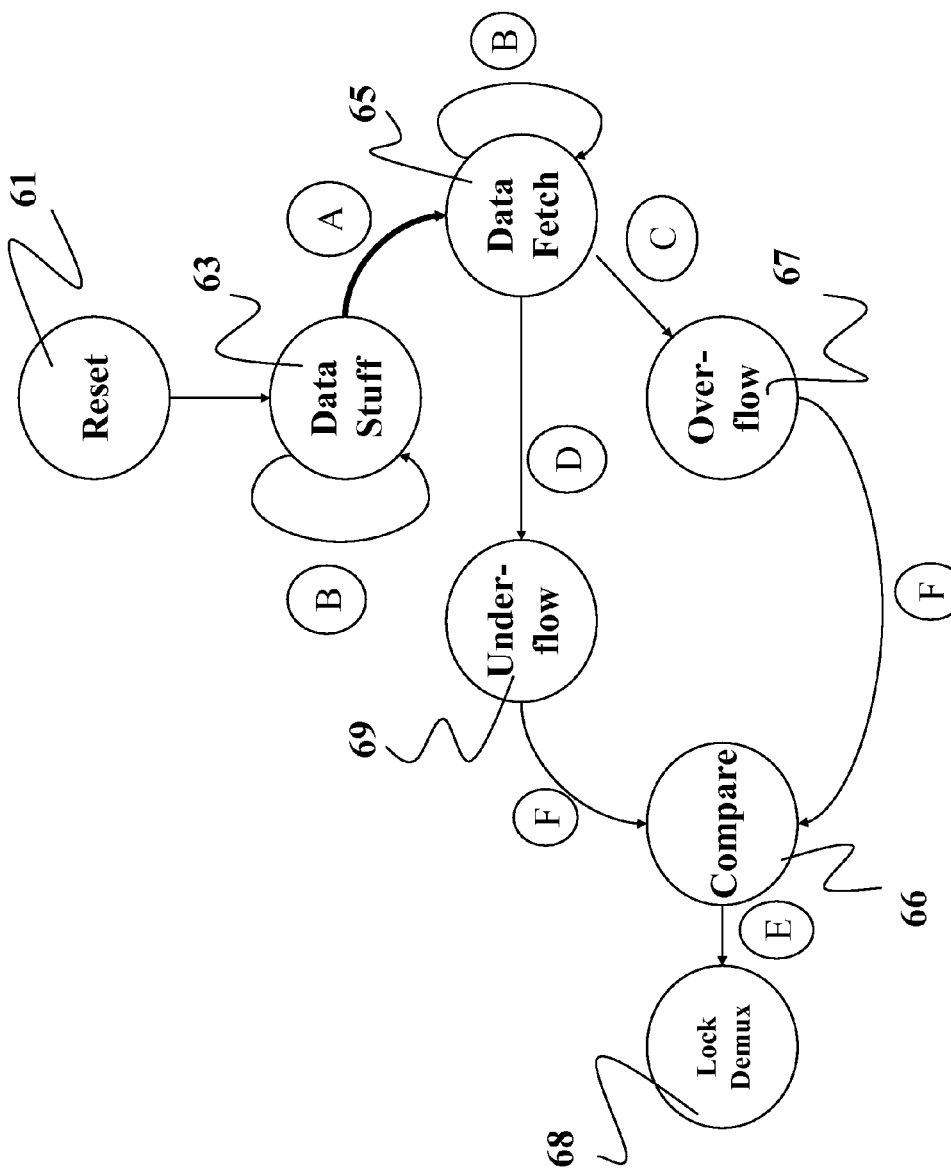
FIG. 9 illustrates in a simplified block diagram a state diagram of an exemplary finite state machine for the buffer of FIG. 8b.

In order to implement the embodiment of FIG. 8b, some additional changes to the finite state machine state diagram may be necessary. FIG. 9 illustrates one state diagram that may be used in an embodiment that addresses the meta-stable condition. In FIG. 9, the finite state machine pointer controller begins, after reset, in an initial state 61 labeled Reset or Packet Start. As transmitted data is recovered from the channel by the CDR circuit the state machine transitions to the Data Stuff state, state 63. On certain conditions, the state machine transitions, using transition "A", to the Data Fetch state, state 65. Again while normal operations are occurring, the transmitter continues sending words to be placed in the buffer, and the receiver fetches data words from the buffer, transition "B", the normal transition, occurs and the state diagram remains in the Data Fetch state. If an overflow condition is detected, transition "C" causes the state machine to transition to the Overflow state, 67. If in contrast an underflow condition is detected, transition "D" causes the state machine to transition to state 69, the Underflow state. If neither an overflow nor an underflow is detected but the finite state machine continues receiving and fetching data until the Packet End is detected, the state machine takes transition G to the Packet Start state, and awaits a new packet.

Transition F from either an overflow or underflow state to the Compare state 66 causes the state machine to determine whether or not a meta-stable condition exists, the pattern of overflow and underflow conditions for a certain number of cycles is compared, and if the system is in a meta-stable condition, the state machine transitions through transition "E" to the Reset Counter state. The Reset Counter state is shown as state 68 in the diagram, and the recovery clock pointer is then forced to a value that will make the system operate in a stable manner for future cycles. Thus the finite state machine now stores three possible outcomes for the next packet cycle: overflow, underflow and meta-stable detected. The fourth outcome is that none of these conditions were detected and if so, the finite state machine remains in state 65 until the Packet End is detected, and transitions using transition G to the Packet Start state, 61.

It is important to note the overall finite state machine is circulated along with the data packet. At the packet start, the elastic buffer starts to stuff data, and the FSM counts to the preset values before data fetch. During the packet reception, one of an overflow, underflow or normal condition happens. At the end of the packet, FSM records the status and makes decision for the next packet. Between packets, there is no data stream transmitted.

In FIG. 9, the finite state machine also records a meta-stable condition when the overflow and underflow conditions alternate, indicating the buffer is in a meta-stable state.

FIG. 10 depicts the actions and conditions used in the transitions for the state diagram of FIG. 9. In FIG. 10, the transition "A" from the Data Stuff state to the Data Fetch state occurs when one of four conditions is detected: no pre_packet_underflow AND no pre_packet_overflow AND count reaches a value, for example M/2; OR, a pre_packet_underflow condition exists (meaning an underflow occurred in a prior cycle) AND the recovery clock pointer is at value M/2; OR, a pre_packet_overflow condition exists meaning an overflow occurred on a previous cycle AND the recovery pointer is at value 2; OR, a new condition for this embodiment, a meta-stable condition exists and the counter is at a value M/4 (the halfway point of the buffer). This last condition indicates that the meta-stable operation was detected in a previous cycle and so the finite state machine is attempting to place the buffer and clock pointers into a stable manner of operation. Essentially the depth of the buffer is being adapted.

In FIG. 10, the transition "C", for overflow detection, and the transition "D", for underflow, are as before; when one clock pointer overtakes the other clock pointer, a flag is set indicating an underflow, or overflow, has occurred. In FIG. 10 transition "F" indicates the finite state machine should compare the underflow and overflow conditions for a selected period of cycles, and if these conditions are occurring in an alternate pattern or one following the other within certain time periods or number of cycles, then transition E to the "Reset Counter" state occurs. The Reset Counter state stores the status and sets the counter limit for the next packet. The finite state machine stays in the Reset Counter state until the Packet End is detected, and then returns to the Packet Start state, 61. FIG. 10 is very similar in most respects to the transition table of FIG. 7, but the meta-stable condition is added.

Figure 11:
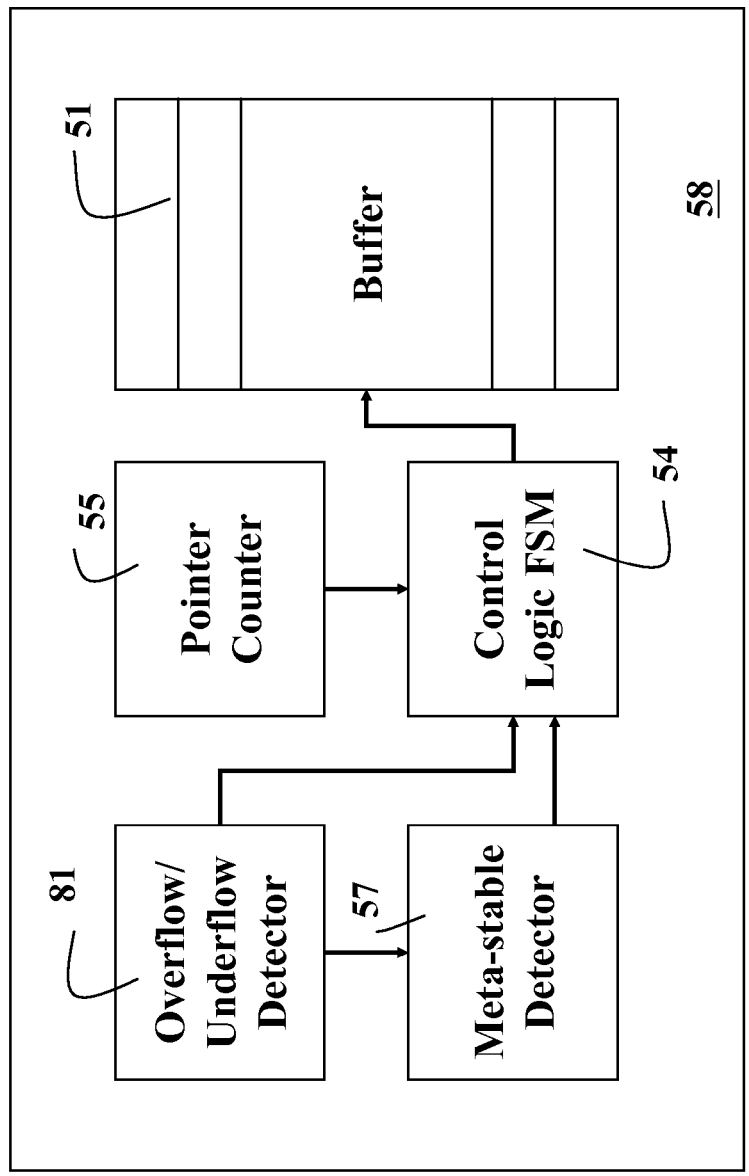
FIG. 11 illustrates in a simplified block diagram an embodiment of an elastic buffer and the associated circuits.

FIG. 11 depicts an illustrative exemplary embodiment block diagram for an integrated circuit, or a portion of an integrated circuit, or a circuit board, that implements the functions of the elastic buffer and control circuits of the present invention. In FIG. 11, block 58 is formed of the buffer 51, control logic and finite state machine (FSM) 54, meta-stable detector 57, overflow/underflow detector 81, and pointer/counter 55, each of which communicates with the control logic and finite state machine 54, which controls the overall operations of the buffer 51. As is known to those skilled in the art, the block diagram of FIG. 11 is but one possible arrangement of these functions and by combining, or partitioning, these blocks in different ways, other block diagrams may be formed that perform the same functions and provide the same benefits as the exemplary block diagram illustrated in FIG. 11. These alternate arrangements are additional alternative embodiments that are contemplated as part of the invention and which fall within the scope of the appended claims.

Figure 12:
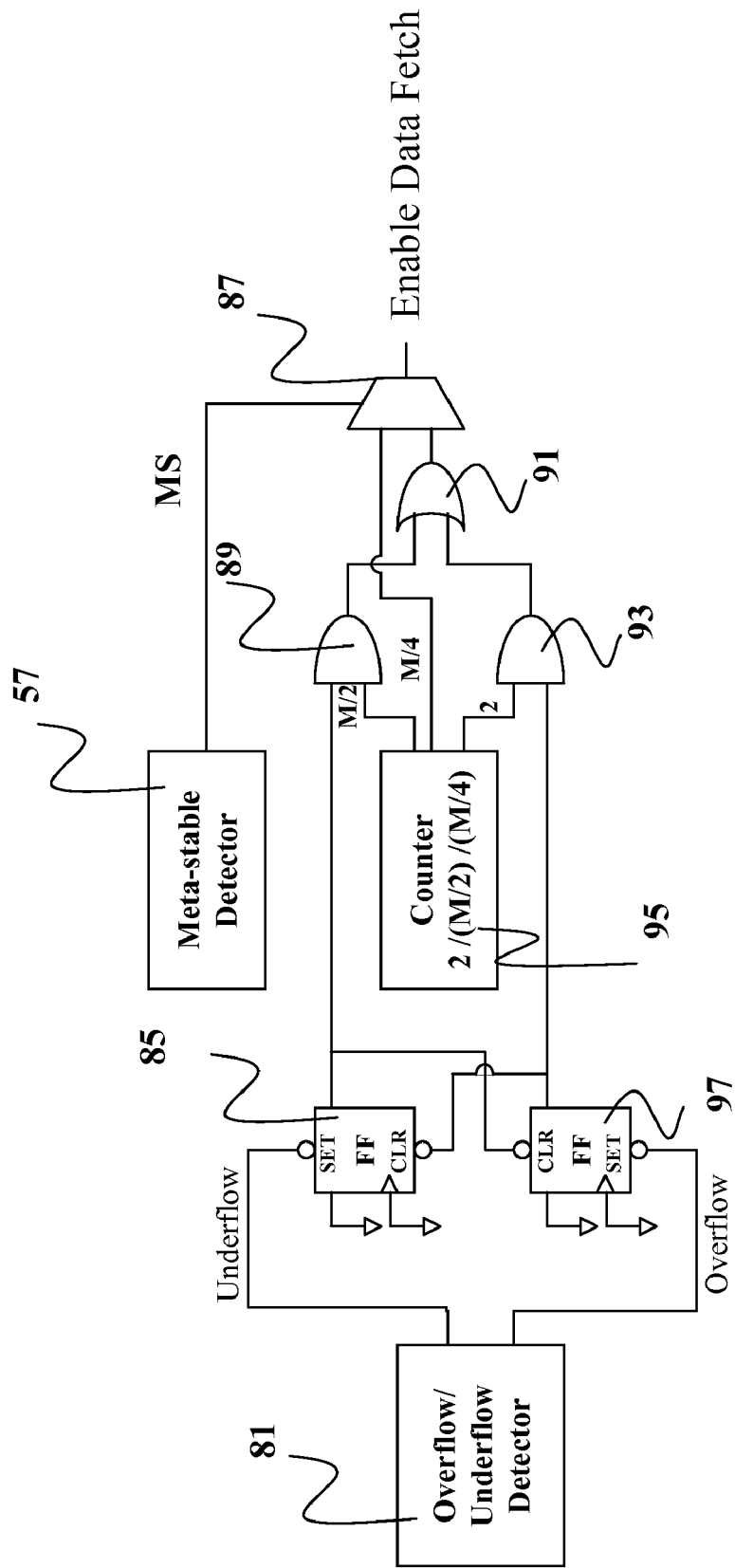
FIG. 12 illustrates in a simplified circuit diagram an embodiment of an exemplary control circuit that may be used with the elastic buffer of the present invention.

FIG. 12 depicts in an exemplary embodiment a portion of the control logic found in control logic and finite state machine 54 (shown in FIG. 1). In FIG. 12, Overflow/Underflow detector 81 provides two outputs, labeled Underflow and Overflow, to a pair of set/reset registers 85 and 97, respectively. When an underflow is detected, the register 85 is set, and the output signal from this register will clear the overflow register 97, so that the two registers are not set at the same instant. AND gate 89 then receives the underflow indication, which is the "pre_packet_underflow" condition described above, and when the counter output block 95 outputs an "M/2" value, and AND gate 89 outputs a "high" or "true" value to OR gate 91, the "Enable Data Fetch" flag is output by multiplexer 87. When the finite state machine is in the Data Stuff state, transition "A" will occur when the "Enable Data Fetch" signal is true. See the state diagrams of FIGS. 7 and 10. Similarly, when an overflow condition is detected, register 97 is set, and the output is fed to the input of AND gate 93, which, when the counter block 95 detects the counter is at value "2", AND gate 93 will output a high or true value to OR gate 91, again this will cause a true output on the "Enable Data Fetch" signal.

The counter block 95 has a third output, for value "M/4". When the block labeled "Meta-stable Detector", block 57, outputs a high signal on output MS, the multiplexer 87 will select the "M/4" output from the counter block 95. When the recovery pointer is at "M/4" and the meta-stable output MS is true, the finite state machine will again transition from the "Data Stuff" state to the "Data Fetch" state in FIG. 10; transition "A". In this manner the finite state machine manages the pointers so that the underflow and overflow, and in FIG. 10, the meta-stable conditions, do not recur in future cycles by adaptively changing the elastic buffer depth to suit the data rates of the transmitter and the receiver that is fetching data from the buffer.

Figure 13:
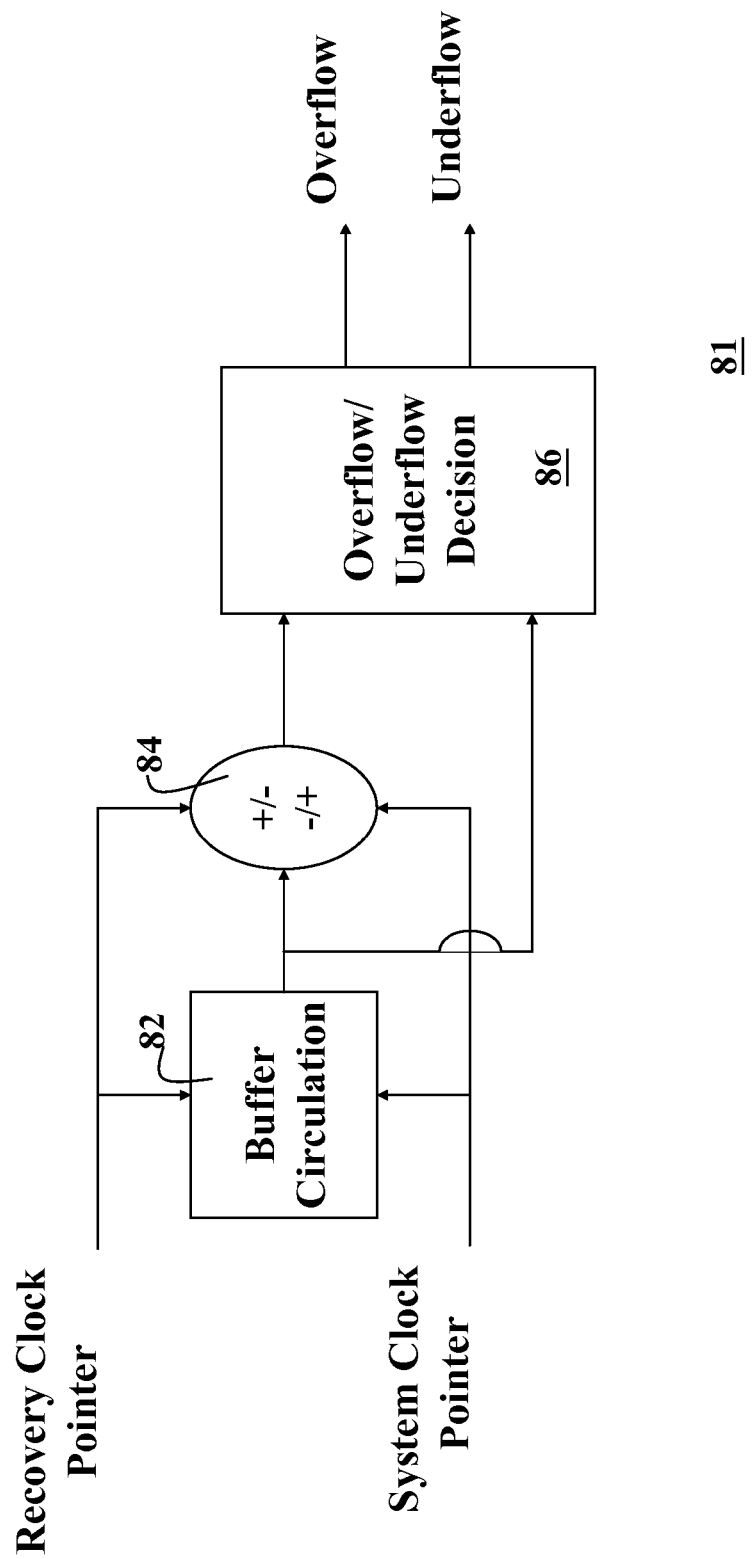
FIG. 13 illustrates in a simplified circuit diagram an embodiment of an exemplary underflow and overflow detection circuit that may be used with the elastic buffer of the present invention.

FIG. 13 depicts, in a simple block diagram, the functions used in an exemplary embodiment to implement the Overflow/Underflow detector 81 in FIG. 12. In FIG. 13, the recovery clock pointer and the system clock pointer values are input to detector 81. The Buffer Circulation block 82 determines when the pointers are at an equal value, and the ± and ∓ block 84 determines which clock pointer is overtaking the other one. These inputs are then input to the decision block 86 which outputs the signals Overflow, and Underflow, based on these inputs.

Figure 14:
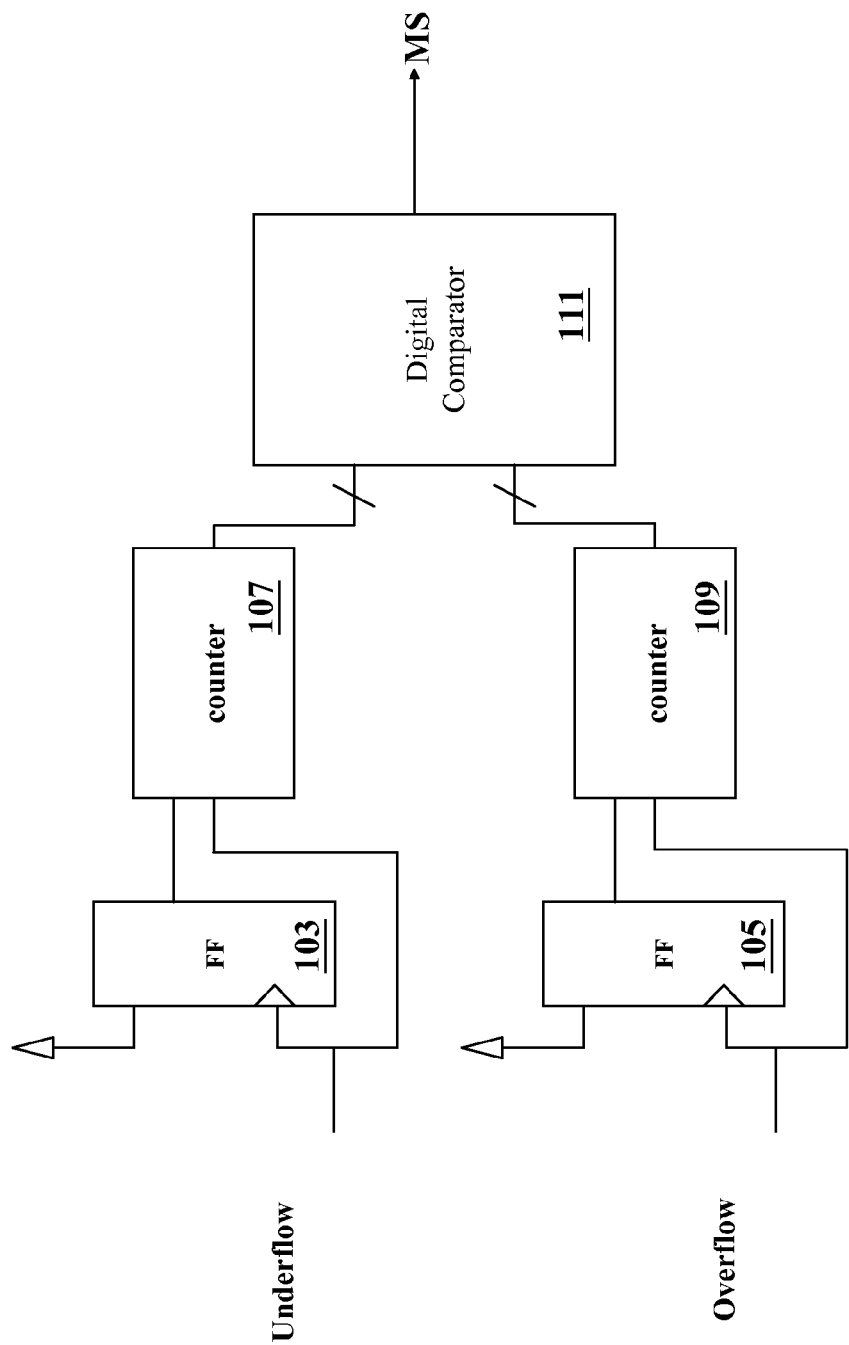
FIG. 14 illustrates in a simplified circuit diagram an embodiment of an exemplary meta-stable detector circuit that may be used with the elastic buffer of the present invention.

FIG. 14 depicts, in an exemplary illustrative embodiment, a possible implementation for the meta-stable detector 83 of FIG. 12. In FIG. 14, the inputs Underflow and Overflow are received from Overflow/Underflow detector 81. A pair of flip flops 103 and 105 receives these inputs and output clocked high or true signals to counters 107 and 109. A digital comparator 111 then compares the number of Overflow and Underflow indications in a period of time, and if a threshold is met, determines that the buffer and pointers are in a meta-stable condition and outputs a high or true signal on output MS. This signal is used by the finite state machine to determine that a meta-stable condition exists, and it is also used in the Data Fetch Enable circuit as well.

The circuit embodiments illustrated above may be implemented as hardware, logic circuitry, programmable logic devices such as PLDs, PLAs, and the like, or in storage including non-volatile memory, firmware with logic, or in software executing on a programmable device such as a microcontroller or microprocessor, as is known in the art. All of these implementations are contemplated as alternative embodiments of the present invention and are within the scope of the appended claims.

An exemplary method of providing an elastic buffer of a depth M of the present invention is performed by providing a physical buffer of depth M/2, receiving data from a communications channel, recovering the data and a clock signal from the received data, stuffing data into the buffer and increasing a recovery clock pointer for each data word, detecting when the recovery clock pointer exceeds a target value, enabling data to be fetched from the M/2 buffer by a receiver circuit and increasing a system clock pointer for each data word fetched from the buffer, detecting when the recovery clock pointer overtakes the system clock pointer and setting an overflow condition flag, and detecting when the system clock pointer overtakes the recovery clock pointer and setting an underflow condition flag.

Although the present invention and its advantages have been described in detail, it should be understood that various changes, substitutions and alterations can be made herein without departing from the spirit and scope of the invention as defined by the appended claims. For example, it will be readily understood by those skilled in the art that the methods may be varied while remaining within the scope of the present invention.

Moreover, the scope of the present application is not intended to be limited to the particular embodiments of the methods and steps described in the specification. As one of ordinary skill in the art will readily appreciate from the disclosure of the present invention, processes, or steps, presently existing or later to be developed, that perform substantially the same function or achieve substantially the same result as the corresponding embodiments described herein may be utilized according to the present invention. Accordingly, the appended claims are intended to include within their scope such processes or steps.

What is claimed is:

1. A method for performing an elastic buffer of virtual depth M, wherein M is a positive integer, comprising:
   providing a data buffer of a physical depth not more than half of depth M;
   providing a recovery clock pointer indicating an available data buffer location to be stuffed with a received data word;
   providing a system clock pointer indicating a data buffer location having a data word to be fetched by a receiver;
   providing a clock and data recovery circuit for receiving data and clock signals transmitted over a communications channel;
   stuffing received data in the location in the data buffer indicated by the recovery clock pointer;
   increasing the recovery clock pointer to point to another available data buffer location;
   continuing storing received data in the data buffer at the location indicated by the recovery clock pointer and increasing the recovery clock pointer as data signals are received;
   detecting when a predetermined condition occurs and enabling a data fetch operation;
   responsive to the enabling, fetching stored received data from a buffer location indicated by the system clock pointer; and
   increasing the system clock pointer to indicate another data buffer location containing data to be fetched.

2. The method of claim 1, further comprising:
   continuing to fetch the stored received data from a buffer location indicated by the system clock pointer and continuing to increase the system clock pointer until all of the data words stored in the buffer are fetched.

3. The method of claim 1, wherein detecting when a predetermined condition occurs further comprising:
   determining that an underflow condition did not occur on a previous cycle;
   determining that an overflow condition did not occur on a previous cycle; and
   determining that the recovery clock pointer has reached a predetermined value.

4. The method of claim 3, wherein the predetermined value is M/2.

5. The method of claim 3, wherein the predetermined value is 2.

6. The method of claim 1, further comprising:
   while fetching the stored data from the buffer, detecting that the system clock pointer is overtaking the recovery clock pointer and setting an underflow indication for use in a future cycle.

7. The method of claim 1, further comprising:
   while fetching the stored data from the buffer, detecting that the recovery clock pointer is overtaking the system clock pointer and setting an overflow indication for use in a future cycle.

8. The method of claim 6, wherein detecting a predetermined condition further comprises:
   determining that an underflow condition occurred during a previous cycle; and
   determining that the recovery clock pointer has reached a value of M/2.

9. The method of claim 7, wherein detecting a predetermined condition further comprises:
   determining that an overflow condition occurred during a previous cycle; and
   determining that the recovery clock pointer has reached a value of 2.

10. The method of claim 1, further comprising:
    while fetching the stored data from the buffer, detecting that a meta-stable condition has occurred and setting a meta-stable indicator for use in a future cycle.

11. The method of claim 10, wherein detecting that a meta-stable condition has occurred further comprises:
    detecting that one of an underflow and an overflow condition has occurred;
    determining a number of underflow and overflow conditions that have occurred over a predetermined period of time; and
    if the number of underflow and overflow conditions exceeds a predetermined threshold, indicating that a meta-stable condition has occurred.

12. The method of claim 10, wherein detecting a predetermined condition further comprises:
    determining that a meta-stable condition occurred during a previous cycle; and
    determining that the recovery clock pointer has reached a value of M/4.

13. The method of claim 1, wherein M is greater than or equal to 32.

14. The method of claim 1, wherein M is greater than or equal to 8.

15. An elastic buffer circuit of virtual depth M, wherein M is a positive integer, comprising:
- a buffer having M/2 physical locations for storing received data words and an output for outputting stored data words;
- a recovery clock pointer for indicating which of the M/2 locations a received data word is to be stuffed into;
- a system clock pointer for indicating which of the M/2 locations a stored data word is to be fetched from;
- a controller for controlling operations of the buffer, the recovery clock pointer, and the system clock pointer;
- a clock and data recovery circuit for recovering data and clock signals from a received signal having embedded clock information;
- a data fetch enable circuit for detecting a predetermined condition and outputting a data fetch enable signal to the controller; and
- wherein upon receiving a data word from a communications channel in the clock and data recovery circuit, the controller causes the data to be stuffed into the buffer location indicated by the recovery clock pointer and increments the recovery clock pointer, and upon receiving the output from the data fetch enable circuit, the controller enables a data fetch circuit to retrieve the data stored at the location indicated by the system clock pointer and then increments the system clock pointer.

16. The elastic buffer circuit of claim 15, wherein the data fetch enable circuit further comprises:
- an underflow input indicating an underflow condition occurred on a prior cycle;
- an overflow input indicating an overflow condition occurred on a prior cycle;
- a count comparator having outputs indicating that the recovery clock pointer has reached a predetermined value of 2, and M/2, respectively;
- logic circuitry for outputting the data fetch enable signal when the underflow input is true and the count comparator indicates the recovery clock pointer has reached M/2;
- logic circuitry for outputting the data fetch enable signal when the overflow input is true and the count comparator indicates the recovery clock pointer has reached 2; and
- logic circuitry for outputting the data fetch enable signal when the overflow input and the underflow input are both false and the count comparator indicates the recovery clock pointer has reached a predetermined value.

17. The elastic buffer circuit of claim 15, wherein the controller further comprises a finite state machine.

18. The elastic buffer circuit of claim 15, wherein M is an integer greater than 8.

19. The elastic buffer circuit of claim 15, wherein M is an integer greater than or equal to 32.

20. The elastic buffer circuit of claim 15, wherein the data received from the communications channel is encoded in PCI Express format.

21. An integrated circuit having a data buffer of a virtual depth M, wherein M is a positive integer, and a physical depth of M/2, comprising:
- data receivers coupled to receive signals from a serial communications channel including data signals and embedded clock signals;
- a clock and data recovery circuit coupled to the data receivers for recovering clock information and data words received from the serial communications channel;
- a data buffer coupled to receive data words from the clock and data recovery circuit and to store the received data words at locations indicated by a recovery clock pointer;
- a data fetch circuit coupled to fetch data words stored in the data buffer from locations indicated by a system clock pointer;
- a control circuit coupled to the data buffer, the recovery clock pointer and the system clock pointer, operable to cause the received data words to be stored in the data buffer at the location indicated by the recovery clock pointer and to increment the recovery clock pointer;
- the control circuit further having a data fetch enable signal as an input and operable to cause the data fetch circuit to retrieve data words from the data buffer at the location indicated by the system clock pointer responsive to the data fetch enable input, and to increment the system clock pointer; and
- a data fetch enable circuit operable to output the data fetch enable signal upon detection of a predetermined condition.

22. The integrated circuit of claim 21, wherein the data fetch enable circuit further comprises:
- an underflow input indicating a data buffer underflow occurred on a prior cycle;
- an overflow input indicating a data buffer overflow occurred on a prior cycle;
- a counter compare circuit for outputting indicator signals when the recovery clock pointer reaches a value of 2, and M/2, respectively;
- logic circuitry for outputting the data fetch enable signal when the underflow input is true and the recovery clock pointer reaches M/2;
- logic circuitry for outputting the data fetch enable signal when the overflow input is true and the recovery clock pointer reaches 2; and
- logic circuitry for outputting the data fetch enable signal when the underflow input is false and the overflow input is false and the recovery clock pointer reaches a predetermined value greater than 2.

23. The integrated circuit of claim 22, further comprising:
- underflow detection circuitry for detecting an underflow condition when the system clock pointer overtakes the recovery clock pointer during data fetch operations, operable to set the underflow input for a future cycle.

24. The integrated circuit of claim 22, further comprising:
- overflow detection circuitry for detecting an overflow condition when the recovery clock pointer overtakes the system clock pointer during data fetch operations, operable to set the overflow input for a future cycle.

25. The integrated circuit of claim 22, further comprising:
- meta-stable detection circuitry receiving the overflow input and the underflow input, and determining, when one of these inputs is true, a number of overflow and underflow conditions that have occurred over a predetermined time period; and
- an indicator circuit outputting a meta-stable output for use in a future cycle if the number of overflow and underflow conditions that occurred exceeds a predetermined threshold.

26. The integrated circuit of claim 25, wherein the data fetch enable circuit further comprises:
- logic circuitry operable to output the data fetch enable signal when the meta-stable output is true and the recovery clock pointer reaches a value of M/4.

27. The integrated circuit of claim 21, wherein the control circuit comprises a finite state machine.

28. The integrated circuit of claim 21, wherein M is an integer greater than 8.

29. The integrated circuit of claim 21, wherein M is an integer greater than or equal to 32.

* * * * *